United States Patent
Raptis et al.

(10) Patent No.: US 10,223,580 B2
(45) Date of Patent: Mar. 5, 2019

(54) METHODS AND SYSTEMS FOR ACTION RECOGNITION USING POSELET KEYFRAMES

(71) Applicant: Disney Enterprises, Inc., Burbank, CA (US)

(72) Inventors: Michail Raptis, Burbank, CA (US); Leonid Sigal, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1307 days.

(21) Appl. No.: 14/025,722

(22) Filed: Sep. 12, 2013

(65) Prior Publication Data

US 2014/0294360 A1   Oct. 2, 2014

Related U.S. Application Data

(60) Provisional application No. 61/805,383, filed on Mar. 26, 2013.

(51) Int. Cl.
| | |
|---|---|
| *G06K 9/00* | (2006.01) |
| *G06K 9/62* | (2006.01) |
| *H04N 5/33* | (2006.01) |
| *G06K 9/46* | (2006.01) |

(52) U.S. Cl.
CPC ..... *G06K 9/00335* (2013.01); *G06K 9/00281* (2013.01); *G06K 9/00348* (2013.01); *G06K 9/00362* (2013.01); *G06K 9/00751* (2013.01); *G06K 9/4671* (2013.01); *G06K 9/6278* (2013.01); *G06K 9/6292* (2013.01)

(58) Field of Classification Search
CPC ........ G06K 9/10; G06K 9/00281; G06K 9/62; G06K 9/6278; G06K 9/00335; G06K 9/00342; G06K 9/00348; G06K 9/00362; G06K 9/4604; G06K 9/4671; G06K 9/6292

USPC ................. 382/103, 159; 348/169, 171, 172
See application file for complete search history.

(56) References Cited

U.S. PATENT DOCUMENTS

| 7,515,735 B2 * | 4/2009 | Miyamori ................ G06T 7/20 |
| | | 382/103 |
| 7,558,404 B2 * | 7/2009 | Ma ..................... G06K 9/00342 |
| | | 348/157 |

(Continued)

OTHER PUBLICATIONS

Assa, J., et al., Action synopsis: pose selection and illustration, ACM Transactions on Graphics (TOG), Jul. 2005, pp. 667-676 vol. 24—issue 3, ACM, New York, NY, USA.

(Continued)

*Primary Examiner* — Helen Shibru
(74) *Attorney, Agent, or Firm* — Sheppard Mullin Richter & Hampton LLP

(57) ABSTRACT

Methods and systems for video action recognition using poselet keyframes are disclosed. An action recognition model may be implemented to spatially and temporally model discriminative action components as a set of discriminative keyframes. One method of action recognition may include the operations of selecting a plurality of poselets that are components of an action, encoding each of a plurality of video frames as a summary of the detection confidence of each of the plurality of poselets for the video frame, and encoding correlations between poselets in the encoded video frames.

34 Claims, 5 Drawing Sheets

(56) References Cited

U.S. PATENT DOCUMENTS

| | | | | |
|---|---|---|---|---|
| 2010/0026809 | A1* | 2/2010 | Curry | H04N 5/222 348/157 |
| 2010/0111370 | A1* | 5/2010 | Black | G06K 9/00369 382/111 |
| 2011/0299729 | A1* | 12/2011 | Dawe | A63B 24/0003 382/103 |
| 2012/0214594 | A1* | 8/2012 | Kirovski | A63F 13/06 463/36 |
| 2012/0308124 | A1* | 12/2012 | Belhumeur | G06K 9/00281 382/159 |
| 2013/0051662 | A1* | 2/2013 | Shiozaki | G06K 9/00228 382/159 |
| 2014/0198108 | A1* | 7/2014 | Sigal | G06T 13/40 345/474 |
| 2015/0186748 | A1* | 7/2015 | Cootes | G06K 9/6282 382/159 |
| 2015/0294192 | A1* | 10/2015 | Lan | G06K 9/6269 382/159 |
| 2016/0042225 | A1* | 2/2016 | Barak | G06K 9/00288 382/118 |
| 2017/0286779 | A1* | 10/2017 | Fan | G06K 9/00778 |

OTHER PUBLICATIONS

Blaschko, M., et al., Learning to localize objects with structured output regression, ECCV 2008, Part 1, LNCS 5302,2 2008, pp. 2-15, Springer-Verlag, Berlin.
Bourdev, L. D., et al., Poselets: Body part detectors trained using 3D human pose annotations, 2009 IEEE 12th International Conference on Computer Vision, Sep. 29-Oct. 2 2009, pp. 1365-1372, IEEE, Kyoto, Japan.
Brendel, W., et al., Learning spatiotemporal graphs of human activities, 2011 IEEE International Conference on Computer Vision (ICCV), Nov. 2011, pp. 778-785, IEEE, Barcelona, Spain.
Carlsson, S., et al., Action recognition by shape matching to key frames, IEEE Computer Society Workshop on Models versus Exemplars in Computer Vision, 2001, pp. 1-8, IEEE.
Chen, C.-Y., et al., Efficient activity detection with max-subgraph search, 2012 IEEE Conference on Computer Vision and Pattern Recognition (CVPR), Jun. 2012, pp. 1274-1281, IEEE, Providence, RI, USA.
Dalal, N., et al., Histograms of oriented gradients for human detection, 2005 IEEE Computer Society Conference on Computer Vision and Pattern Recognition (CVPR), Jun. 2005, pp. 886-893, vol. 1, IEEE, San Diego, CA, USA.
Delaitre, V., et al., Recognizing human actions in still images: a study of bag-of-features and part-based representations, British Machine Vision Conference (BMVC) 2010, Aug. 31-Sep. 3, 2010, pp. 1-11, BMVC, Aberystwyth, UK.
Dollar, P., et al., Behavior recognition via sparse spatio-temporal features, 2nd Joint IEEE International Workshop on Visual Surveillance and Performance Evaluation of Tracking and Surveillance (VS-PETS) 2005, Oct. 2005, pp. 65-72, IEEE.
Duong, T., et al., Activity recognition and abnormality detection with the switching hidden semi-markov model, 2005 IEEE Computer Society Conference on Computer Vision and Pattern Recognition (CVPR), Jun. 2005, pp. 838-845, vol. 1, IEEE, San Diego, CA, USA.
Felzenszwalb, P., et al., Object detection with discriminatively trained part based models, IEEE Transactions on Pattern Analysis and Machine Intelligence (PAMI), Sep. 2010, pp. 1627-1645, vol. 32—issue 9, IEEE.
Hoai, M. et al., Joint segmentation and classification of human actions in video, 2011 IEEE Conference on Computer Vision and Pattern Recognition (CVPR), Jun. 2011, pp. 3265-3272, IEEE, Providence, RI, USA.
Ikizler, N. et al., Searching video for complex activities with finite state models, 2007 IEEE Conference on Computer Vision and Pattern Recognition (CVPR '07), Jun. 2007, pp. 1-8, IEEE, Minneapolis, MN, USA.

Kong, Y., et al., Learning human interaction by interactive phrases, ECCV'12 Proceedings of the 12th European conference on Computer Vision, 2012, pp. 300-313, vol. Part I, Springer-Verlag, Berlin.
Kourtzi, Z., et al., Activation in human MT/MST by static images with implied motion, Journal of Cognitive Neuroscience, 2000, p. 48-55, vol. 12—issue 1, Massachusetts Institute of Technology.
Lampert, C., et al., Efficient subwindow search: A branch and bound framework for object localization, IEEE Transactions on Pattern Analysis and Machine Intelligence (PAMI), Dec. 2009, pp. 2129-2142, vol. 31—issue 12, IEEE.
Laptev, I., On space-time interest points, International Journal of Computer Vision (IJCV), Sep. 2005, pp. 107-123, vol. 6—issue 2-3, Kluwer Academic Publishers, Hingham, MA, USA.
Li, L.-J., et al., Object bank: A high-level image representation for scene classification and semantic feature sparsification, Neural Information Processing Systems (NIPS) 2010, Dec. 2010, pp. 1-9, Vancouver, Canada.
Liu, J., et al., Recognizing human actions by attributes, 2011 IEEE Conference on Computer Vision and Pattern Recognition (CVPR), Jun. 2011, pp. 3337-3344, IEEE, Providence, RI, USA.
Liu, L., et al., Boosted key-frame selection and correlated pyramidal motion-feature representation for human action recognition, Pattern Recognition, Oct. 12, 2012, pp. 1810-1818, vol. 46, Elsevier Ltd.
Maji, S., et al., Action recognition from a distributed representation of pose and appearance, 2011 IEEE Conference on Computer Vision and Pattern Recognition (CVPR), Jun. 2011, pp. 3177-3184, IEEE, Providence, RI, USA.
Hoai, M., et al., Max-margin early event detectors, 2012 IEEE Conference on Computer Vision and Pattern Recognition (CVPR), Jun. 2012, pp. 2863-2870, IEEE, Providence, RI, USA.
Niebles, J. C., et al., Modeling temporal structure of decomposable motion segments for activity classification, ECCV'10 Proceedings of the 11th European conference on Computer vision: Part II, 2010, pp. 392-405, Springer-Verlag, Berlin.
Raptis, M., et al., Discovering discriminative action parts from mid-level video representations, 2012 IEEE Conference on Computer Vision and Pattern Recognition (CVPR), Jun. 2012, pp. 1242-1249, IEEE, Providence, RI, USA.
Ryoo, M., Human activity prediction: Early recognition of ongoing activities from streaming videos, 2011 IEEE International Conference on Computer Vision (ICCV), Nov. 2011, pp. 1036-1043, IEEE, Barcelona, Spain.
Ryoo, M., et al., Ut-interaction dataset, icpr contest on semantic description of human activities (sdha), 2010, http://cvrc.ece.utexas.edu/SDHA2010/Human_Interaction.html, accessed Nov. 12, 2015.
Sadanand, S., et al., Action bank: A high-level representation of activity in video, 2012 IEEE Conference on Computer Vision and Pattern Recognition (CVPR), Jun. 2012, pp. 1234-1241, IEEE, Providence, RI, USA.
Satkin, S., et al., Modeling the temporal extent of actions, ECCV'10 Proceedings of the 11th European conference on Computer vision: Part I, 2010, pp. 536-548, Springer-Verlag, Berlin.
Schindler, K, et al., Action snippets: How many frames does human action recognition require?, 2008 IEEE Conference on Computer Vision and Pattern Recognition (CVPR), Jun. 2008, pp. 1-8, IEEE, Anchorage, AK, USA.
Singh V. K., et al., Action recognition in cluttered dynamic scenes using pose-specific part models, 2011 IEEE International Conference on Computer Vision (ICCV), Nov. 2011, pp. 113-120, IEEE, Barcelona, Spain.
Sminchisescu, C., et al., Conditional models for contextual human motion recognition, 2005 IEEE International Conference on Computer Vision (ICCV), Oct. 2005, pp. 1808-1815, vol. 2, IEEE, Beijing, China.
Tang, K. et al., Learning latent temporal structure for complex event detection, 2012 IEEE Conference on Computer Vision and Pattern Recognition (CVPR), Jun. 2012, pp. 1250-1257, IEEE, Providence, RI, USA.
Thurau, C., et al., Pose primitive based human action recognition in videos or still images, 2008 IEEE Conference on Computer Vision and Pattern Recognition (CVPR), Jun. 2008, pp. 1-8, IEEE, Anchorage, AK, USA.

(56) References Cited

OTHER PUBLICATIONS

Vahdat, A., et al., A discriminative key pose sequence model for recognizing human interactions, 2011 IEEE International Conference on Computer Vision Workshops (ICCV Workshops), Nov. 2011, pp. 1729-1736, IEEE, Barcelona, Spain.
Wang, Y., et al., Learning hierarchical poselets for human parsing, 2011 IEEE Conference on Computer Vision and Pattern Recognition (CVPR), Jun. 2011, pp. 1705-1712, IEEE, Providence, RI, USA.
Yang, W., et al., Recognizing human actions from still images with latent poses, 2010 IEEE Conference on Computer Vision and Pattern Recognition (CVPR), Jun. 2010, pp. 2030-2037, IEEE, San Francisco, CA, USA.
Yao, A., et al., A hough transform-based voting framework for action recognition, 2010 IEEE Conference on Computer Vision and Pattern Recognition (CVPR), Jun. 2010, pp. 2061-2068, IEEE, San Francisco, CA, USA.
Zhang, Y., et al., Spatio-temporal phrases for activity recognition, ECCV'12 Proceedings of the 12th European conference on Computer Vision, 2012, pp. 707-721, vol. Part III, Springer-Verlag, Berlin.
Zhao, Z., et al., Information theoretic key frame selection for action recognition, British Machine Vision Conference (BMVC), Sep. 2008, pp. 1-10, BMVC, Leeds, UK.
Raptis, M., et al., Poselet Key-framing: A Model for Human Activity Recognition, 2013 IEEE Conference on Computer Vision and Pattern Recognition (CVPR), Jun. 2013, pp. 2650-2657, IEEE, Portland, OR, USA.

* cited by examiner

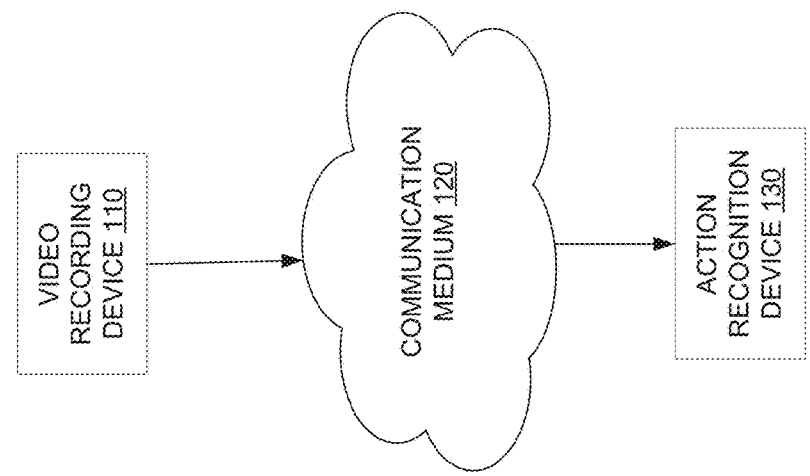

METHODS AND SYSTEMS FOR ACTION RECOGNITION USING POSELET KEYFRAMES

CROSS-REFERENCE TO RELATED APPLICATIONS

This application claims the benefit of U.S. Provisional Application No. 61/805,383 filed on Mar. 26, 2013, which is incorporated herein by reference in its entirety.

TECHNICAL FIELD

The present disclosure relates generally to action recognition techniques, and more particularly, some embodiments relate to methods for modeling human actions as a sequence of discriminative keyframes.

DESCRIPTION OF THE RELATED ART

Most research on video-based action recognition modeling focuses on computing features over long temporal trajectories with many frames (e.g. 20 or 100 frame segments). This approach to action modeling, although descriptive, can be computationally expensive. Moreover, this approach to modeling may be sensitive to changes in action duration and dropped frames. Accordingly, an action recognition model that can effectively represent actions as a few key frames depicting key states of the action is desirable.

BRIEF SUMMARY OF THE DISCLOSURE

According to various embodiments of the disclosed methods and systems, actions are modeled as a sequence of discriminative key frames. In one embodiment, a computer is configured to select a plurality of poselets that are components of an action, encode each of a plurality of video frames recorded by a video recording device as a summary of the detection confidence of each of the plurality of poselets for the video frame, and encode correlations between poselets in the encoded video frames. Optimal video frames may be selected based on the encoded video frames and encoded correlations. This process determines whether an action occurs in the video frames.

In one embodiment, each of the plurality of poselets is an image patch of arbitrary size. In another embodiment, each of the plurality of poselets is a partial or full three-dimensional configuration of a human body.

In one embodiment, encoding correlations between poselets in the encoded video frames comprises determining if a first poselet is present in a first video frame, and determining if a second poselet is present in a second video frame. In one embodiment, the first and second video frames are consecutive video frames. In another embodiment, the first and second video frames are not consecutive video frames.

In one embodiment, selecting a plurality of poselets that are components of an action comprises for each of a plurality of poselets creating a first type of poselet based on the first poselet classifier and creating a second type of poselet based on the second poselet classifier.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 1A illustrates a communications environment in accordance with the present disclosure.

Figure 1B:
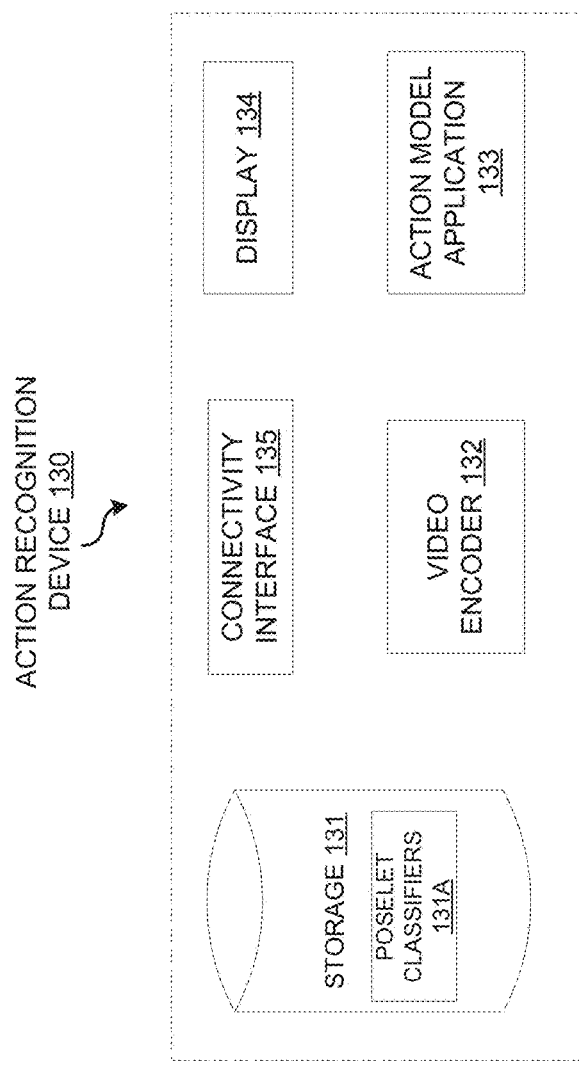
FIG. 1B illustrates a high-level block diagram of an action recognition device that may be used in accordance with the system of FIG. 1A.

The figures are not exhaustive and do not limit the disclosure to the precise form disclosed.

DETAILED DESCRIPTION

FIG. 1A illustrates a communications environment for action recognition in accordance with the present disclosure. In communications environment 100, video recording device 110 records video that is then transmitted to video action recognition device 130 over communication medium 120. Action recognition device 130 may comprise any computing device (tablets, PDA's, smartphones, cellphones, palmtops, laptops, etc.), workstations or servers, or any other type of general-purpose computing device configured to receive video frames and recognize if one or more actions are present in the video frames.

In one implementation, communications environment 100 may comprise a distributed environment where multiple action recognition devices 130 perform video action recognition. For example, different segments of a video from video recording device 110 may be transmitted to each action recognition device 130 over communication medium 120. In yet another example, multiple video recording devices 110 may transmit video over communication medium 120 to one or more action recognition devices 130.

Communication medium 120 may comprise a communications network such as a cellular telephone/data network, an ad hoc network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. The medium 120 may be a wireless network system such as a cellular network, a wireless personal area network, a wireless local area network, a Bluetooth system, or other similar communication medium. The medium alternatively may be a wired system, such as a coaxial cable system, a fiber optic cable system, an Ethernet cable system, a USB system, or other similar communication medium. In another implementation, video recording device 110 and action recognition device 130 may be integrated into one module.

Action recognition device 130 may be implemented in any communications environment 120 where the temporal recognition of human activity is desired. Communications environment 100 may be a dynamic environment implementing real-time action recognition. For example, communications environment 100 may be a security environment where action recognition device 130 is configured to determine if suspicious actions such as sneaking or pacing are occurring on a video captured by a security camera 110. Alternatively, communications environment 100 may not require real-time action recognition. For example, action recognition device 130 may be used to generate highlights from a sporting event for future use by identifying key actions such as the throwing of a pitch or the shooting of a basketball.

In another implementation, action recognition device 130 may be used in an interactive environment that responds to human actions. For example, a theme park may have an interactive robot that responds with different gestures depending on the actions it recognizes or detects from nearby humans. Video recording device 110 and action recognition device 130 may be integrated into the interactive robot such that some or all interactions are automated.

FIG. 1B is a high-level block diagram of an action recognition device 130 in accordance with the described system. Action recognition device 130 may comprise a storage 131 configured to store poselet classifiers 131A, video encoder 132, action model application 133, display 134, and connectivity interface 135 for connecting to video recording device 110 through communication medium 120.

Display 134 may be configured to display an interactive video or an indication in response to a recognized action. Alternatively display 134 may be configured as a peripheral for a user of action recognition device 130 to interact with action model application 133 through a user interface (not shown).

Action recognition device 130 may implement an action model application 133 for providing a model for human action recognition. Action model application 133 may be used in conjunction with video encoder 132 and stored poselet classifiers 131A (described below) to provide a model to determine if an action occurs in a set of received video frames.

Figure 2:
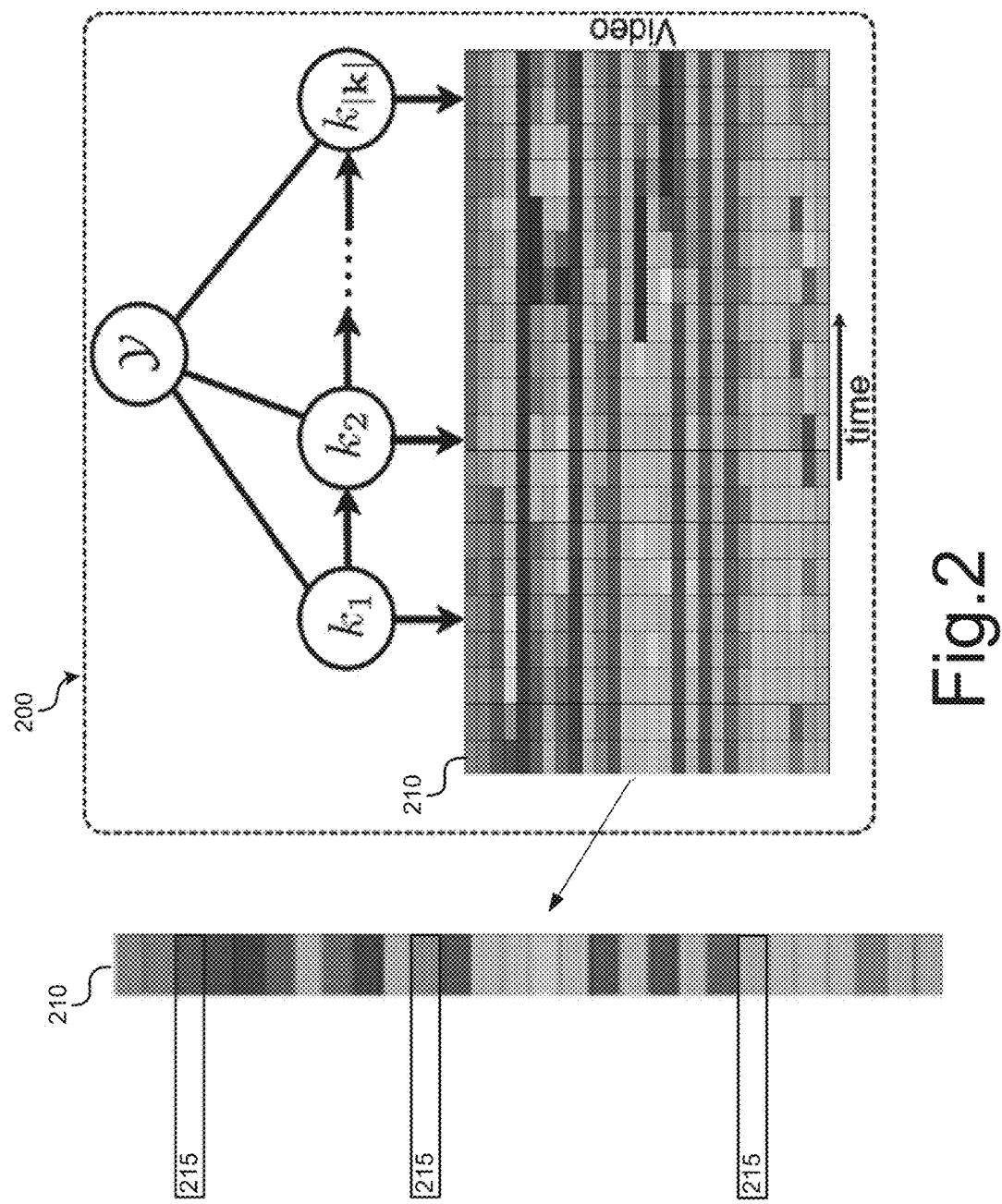
FIG. 2 is an action recognition model that can be implemented by the action recognition device of FIGS. 1A-1B.

FIG. 2 is an action recognition model 200 that can be implemented by action recognition device 130 by performing one or more operations using action model application 133. Action recognition model 200 models an action, for example, a human action, as a sequence of a few discriminative keyframes 210 that are temporally local. A keyframe 210 is a video frame represented as a collection of learned poselet classifier responses 215 depicting key states in the action sequence. Each poselet may capture discriminative action components that carry partial pose and motion information.

Poselets may be image patches of arbitrary size that capture partial or whole pose of a person or partial or full appearance of one or more objects that are indicative of an action. For example, in sports, a poselet may capture a bent leg, a ball, a head-shoulder outline of the player, a ball held by hands, etc. In alternative embodiments, using any capable device a poselet may capture a depth image patch or partial or full three-dimensional posture of a subject.

Action recognition model 200 spatially and temporally models discriminative action components. The modeled temporal context of the action may correspond to the order of the action's components and their temporal correlations (further described below). The modeled spatial context of the action may spatially localize the image regions that are part of the action (further described below).

Action recognition model 200 may provide several benefits over existing methods of modeling human actions. The model, relying on just a few temporally local keyframes, is computationally efficient as it focuses on more distinct parts of the modeled action and applies fewer computational resources to frames that are less discriminative or relevant. The model also is less sensitive to changes in an action's duration or dropped video frames. Moreover, keyframes effectively illustrate motion.

Action recognition model 200 may be defined as follows. For a set of video sequences $\{x_1, \ldots, x_n\} \subset X$ with associated annotations $\{y_1, \ldots, y_n\}$, with $y_i \in \{-1, 1\}$, a mapping function $f: X \to \{-1, 1\}$ is learned to automatically temporally annotate unseen video sequences. As an input the model takes a sequence of unseen images $x_i = \{x_i^1, \ldots, x_i^{T_i}\}$ corresponding to a video, where $T_i$ is the length of the video. As an output, the model indicates whether a particular action occurs within the video. This indication may be modeled by the global label y. The model additionally considers an unknown subset of optimal video frames (keyframes). These keyframes may be defined by unknown variables $k \in K$, where $\kappa = \{k_i \in Z_+ : k_i < k_{i+1}\}$. The model predicts an action's occurrence by considering a scoring function with a spatial term and a temporal term. The spatial term includes a video frame descriptor that considers the probability that poselets discriminative of the action are present in a given video frame. The temporal term includes a pairwise temporal video frame descriptor that considers whether a poselet discriminative of the action is present in consecutive video frames. The temporal video frame descriptor may also consider whether a poselet discriminative of the action is present in non-consecutive video frames.

In one exemplary implementation, the mathematical framework for the model's prediction of an action's occurrence is defined as $y^* = f(x; w) = \operatorname{argmax}_{k \in K} F(x, k; w)$ where $F(x, k; w)$ is a scoring function that may be defined as Equation (1):

$$F(x, k; w) = \sum_{i=1}^{|k|} \langle w_i, \varphi(x^{k_i}) \rangle + \sum_{i=1}^{|k|-1} \langle w_{(i,i+1)}, \psi(x^{k_i}, x^{k_{i+1}}) \rangle + b \qquad (1)$$

where w is a weight factor associated with the importance of a given event (e.g. the spatial presence of a poselet or the temporal correlation between two poselets) for distinguishing an action; $\varphi(x^{k_s})$ is a frame descriptor; and $\psi(x^{k_i}, x^{k_i+1})$ is pair-wise temporal frame descriptor. Under this framework, the first sigma term corresponds to the spatial term of the action and the second sigma term corresponds to the temporal term of the action. Video frames indicated by unknown variables k contribute to the scoring of the video. The scoring function may be linear or non-linear. Although the above set of parameters (e.g. weight factor, frame descriptor, pair-wise temporal frame descriptor) are used for developing an exemplary mathematical formulation for the model, in other embodiments additional or alternative parameters may be used. Moreover, in other embodiments the scoring function may be written in an alternative form.

Figure 3:
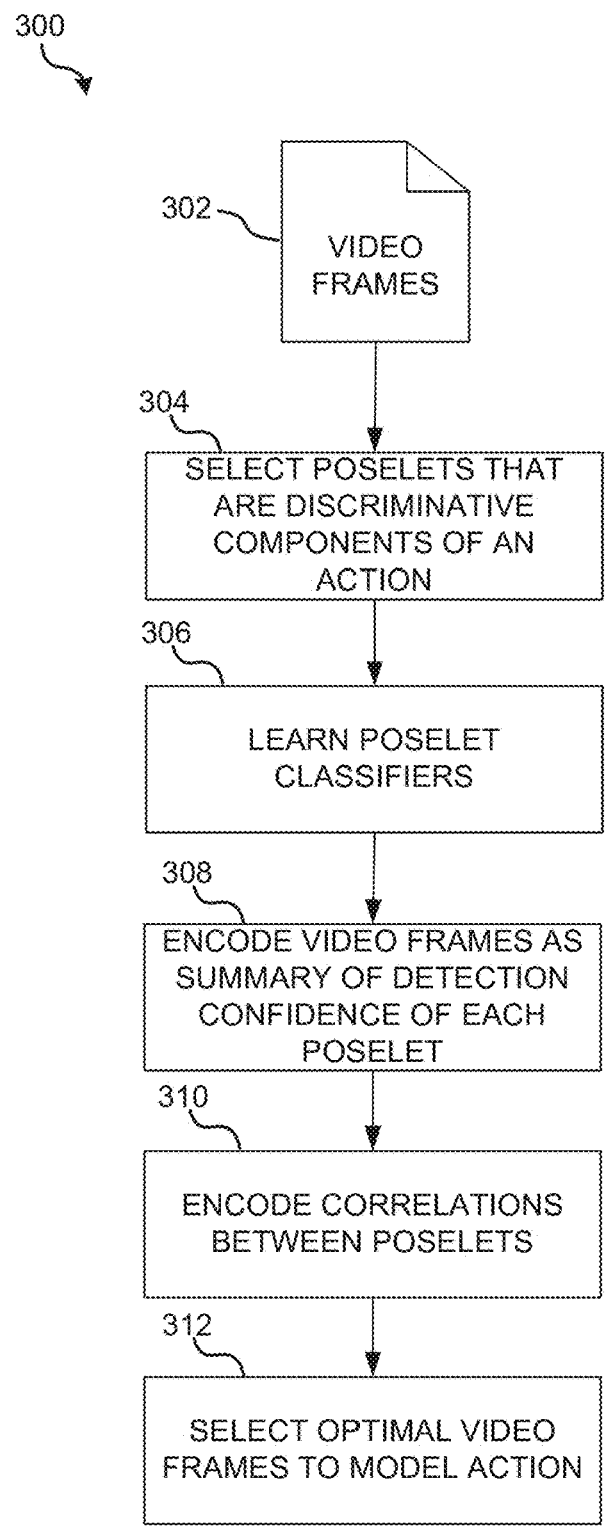
FIG. 3 is an operational flow diagram illustrating an action modeling process that can be performed by an action recognition device in the communications environment of FIGS. 1A-1B.

FIG. 3 is an operational flow diagram illustrating an action modeling process 300 that can be performed by action recognition device 130 to implement action recognition model 200. Process 300 may be implemented by action model application 133 to determine if an action occurs in a set of received video frames 302 (i.e. a video). The action is modeled as a set of discriminative video frames (keyframes). At operation 302, a set of video frames is received. Video frames 302 may be received by action recognition device 130 from video recording device over communications network 120. Alternatively, video frames 302 may be received from storage 131 of action recognition device 130, where they were previously stored.

At operation 304, a set of poselets is selected. Poselets may be selected if they are discriminative components of the action being recognized. A poselet is a discriminative component of an action being recognized if it spatially or temporally depicts a key component of the action. For example, discriminative poselets for a handshake action between two humans may include a walking pose, a hand extension pose, and a hand-closing pose. Determination of whether a poselet is a discriminative action component may be user-defined or automated.

At operation 306, a poselet classifier is learned for the selected poselets. A poselet classifier is a mapping function that uses a known set of images $\{I_1, \ldots, I_n\}$ and their annotations $\{\hat{y}_1, \ldots, \hat{y}_n\} \subset y$ for a poselet to spatially localize the poselet in an unseen image (e.g. a video frame). Spatial localization of the poselet creates a confidence map of the likelihood that the poselet is present at any given pixel of a video frame. A given likelihood is represented as a score.

In one exemplary implementation, poselet classifiers are learned using structured output learning, which may be performed using a Latent Structured Support Vector Machine (SVM). In this implementation, it is assumed that the poselet annotations need to be realigned. Additionally, in this implementation a negative set of annotations (i.e. images where the poselet is not present) is not provided. Structured output learning is applied to align the poselet annotations and to find a negative set of annotations. The structured output is the space of bounding boxes or no bounding box in an image. In other implementations, sliding window classifier techniques may be used to learn the poselet classifiers.

In one exemplary mathematical implementation of structured output learning, the poselet classifier may be learned by optimizing the following equation:

$$\min_{\beta,\xi} \frac{1}{2}\|\beta\|^2 + C' \sum_{i=1}^{n} \xi_i \quad (2)$$

$$\text{s.t } \langle \beta, \theta(I_i, \hat{y}_i) \rangle - \langle \beta, \theta(I_i, \hat{y}) \rangle \geq \Delta(\hat{y}_i, \hat{y}) - \xi_i, \forall \hat{y} \in \hat{Y}$$

$$\xi_i \geq 0, \forall i$$

Where for positive images (poselet present), $\Delta(\hat{y}_i, \hat{y})$ is a loss function that encodes the amount of overlap the predicted bounding box $\hat{y}$ has with ground truth $\hat{y}_i$. For negative images (poselet absent), $\Delta(\hat{y}, \hat{y})=1$, if the prediction indicates a poselet is present. Moreover, $\theta(I_i, \hat{y}_i)=0$ for negative images. Accordingly, in this implementation a poselet is assumed present if its detection score $\langle \beta, \theta(I_i, \hat{y}) \rangle$ is greater than zero.

Operation 306 may be used to generate more than one poselet classifier for a poselet. In one exemplary implementation, a Bag-of-Words (BoW) based poselet classifier and a Histogram of Oriented Gradients (HOG) based poselet classifier are learned for a poselet. The BoW representation represents an image patch using a histogram (count) of how frequently a given pattern of edges, colors, or motion occurs within it. The HOG representation encodes global edge information of the patch (regions of sharp changes in color). The two classifiers may complement each other because BoW representations may model local statistics (textural information), whereas HOG representations may model the global structure of the image patch.

The two types of poselets classifiers may be learned from the same set of annotations $\{\hat{y}_1, \ldots, \hat{y}_n\} \subset y$ by applying Equation (2). For the BoW-based poselet classifiers, $\theta(I_i, \hat{y})$ represents the concatenation of three histograms formed by the quantized dense descriptors contained inside bounding box $\hat{y}$. For the HOG based poselet classifiers, $\theta(I_i, \hat{y})$ corresponds to the vectorized HOG template starting from the upper left corner of bounding box $\hat{y}$.

At operation 308, each video frame is encoded as a summary of the detection confidence of each selected poselet using the poselet classifiers learned in operation 306. Operation 308 may be performed for a given video frame by running each poselet classifier (for a selected poselet) at each pixel of the frame. The highest poselet classifier score (i.e. pixel with highest likelihood of having the selected poselet) is detected. The highest determined scores from each poselet classifier is concatenated to form a poselet activation vector to create a frame descriptor. Using this representation, each term $w_{i,j}\phi(x^{k_i})j$ of Equation (1) represents the likelihood that a j-th poselet is present in the i-th keyframe of the action model.

In an alternative implementation, each poselet classifier may be run at selected pixels or regions of each video frame. In this alternative implementation, the highest poselet classifier score detected for the selected pixels or regions is used to form the poselet activation vector. In yet another implementation, a score threshold may be predefined such that once a score for a pixel is detected above this threshold, the poselet classifier is no longer run against the video frame.

If a selected poselet has more than one poselet classifier, the highest score from each poselet classifier is used to form the poselet activation vector. For example, a selected poselet (e.g. hand extension) may be represented as a HOG-based poselet and a BoW-based poselet. Accordingly, the formed activation vector may comprise two maximum scores (HOG and BoW based) for each selected poselet.

In one implementation, the highest score for BoW based poselets is found using branch-and-bound techniques. In another implementation, the highest score for HOG based poselets may be found by evaluating the poselets using a scanning window technique.

At operation 310, the temporal component of the action is modeled by encoding pairwise correlations between poselets in video frames to create a pairwise frame descriptor. In one implementation, correlations are encoded between consecutive video frames. This is implemented by determining whether a first poselet is present or absent in one video frame and determining whether a second poselet is present or absent in the next video frame. This determination process may comprise decoupling for a frame descriptor poselet detection scores that indicate the presence or absence of a poselet. In an alternative implementation, correlations may be encoded for non-consecutive video frames.

In accordance with the exemplary mathematical framework of equation (1), a pair-wise frame descriptor for consecutive video frames may be created as follows. The poselet detection scores that indicate the presence or absence of a poselet are decoupled for a frame descriptor $\phi$. A non-negative descriptor is created as defined in Equation (3):

$$\overrightarrow{\phi(x^{t_i})} = [\phi(x^{t_i})_1 1_{[\phi(x^{t_i})_1 > 0]}, \cdots \phi(x^{t_i})_1 1_{[\phi(x^{t_i})_1 \leq 0]}, \ldots, \\ \phi(x^{t_i})_{2M} 1_{[\phi(x^{t_i})_{2M} > 0]}, \cdots \phi(x^{t_i})_{2M} 1_{[\phi(x^{t_i})_{2M} \leq 0]}] \quad (3)$$

Where $1_{[\cdot]}$ is an indicator function. After computing and vectorizing the outer product of the augmented descriptors of the two consecutive frames, a pairwise descriptor is defined by Equation (4):

$$\psi * x^{t_i}, x^{t_j} = \text{vec}(\overrightarrow{\phi(x^{t_i})} \, \overrightarrow{\phi(x^{t_i})}^T) \quad (4)$$

Using this representation, a pairwise component $w_{(i,i+1)_{[2j-1,2k]}} \psi(x^{k_s}, x^{k_{i+1}})_{[2j-1,2k]}$ quantifies the fit to action recognition model 200 of the presence of the j-th poselet in the i-th video frame and the absence of the k-th poselet in the next video frame.

At operation 312, optimal video frames (keyframes) are selected to model the action. Optimal key frames are selected by maximizing the scoring function using the parameters derived in operations 304 through 310. This selection process includes determining where the action takes place in space and determining when the action takes place in time. In one implementation, the user of the model may preselect the number of keyframes selected to model an action. In another implementation, an algorithm that considers the type of action being modeled automates the selection of the number of keyframes.

In accordance with the exemplary mathematical framework of equation (1), selection of optimal video frames may comprise maximizing scoring function F (x, k; w) of Equation (1) over unknown variables k. In one implementation, dynamic programming is used to maximize the scoring function. Under this implementation, D(n, m) is defined as the optimal value of scoring function F (x, k; w) of Equation (1) in the case that the last of the n keyframes selected is the m-th frame of the image sequence. The following dynamic programming Equations (5) and (6) may then be defined:

$$D(1, m) = \langle w_1, \phi(x^m) \rangle, \quad (5)$$

$$D(n, m) = \max_{n-1 \leq p < m} \{D(n-1, p) + \langle w_{(n-1,n)}, \psi(x^p, x^m) \rangle\} + \langle w_n, \phi(x^m) \rangle. \quad (6)$$

The optimal solution is defined by Equation (7):

$$F(x_i, k^*; w) = \max_{|k| \leq k_{|k|} \leq T_i} D(|k|, k_{|k|}) \quad (7)$$

Where the indices for the optimal keyframes may be determined by backtracking.

In one implementation, a learning or training process for estimating weights w of the scoring function may be performed to improve the fit (ability to detect actions within selected keyframes) of action recognition model 200. This training process may be iteratively repeated to improve the estimate of weights w.

In accordance with the exemplary mathematical framework of equation (1), for this learning process the scoring function F for a given video $x_i$ may be defined as the inner product (w, $\Psi(x_i,k)$) where:

$$w = [w_{k'}, \ldots, w_{[k]}, w_{(1,2)'}, \ldots, w_{([k]-1, [k])'}1],$$

$$\Psi(x_i,k) = [\phi(x^{k_1}), \ldots, \phi(x^{k[k]}), \psi(x^{k_2}, x^{k_2}), \ldots, \\ \psi(x^{k[k]-1}, x^{k[k]}), b]. \quad (8)$$

Optimizing the estimated weights w may comprise computing the w that minimize the regularized risk defined by Equation (9):

$$\text{minimize}_{w, \xi} \frac{1}{2} \|w\|^2 + C \sum_{i=1}^{n} \xi_i \quad (9)$$

$$\text{s.t } y_i \langle w, \Psi(x_i, k_i^*(w)) \rangle \geq 1 - \xi_i, \forall i,$$

$$\xi_i \geq 0, \forall i.$$

In one implementation Equation (9) may be minimized for a given w by performing an alternation optimization. An alternation optimization may comprise performing the following two operations. First, given w for each training video, the unknown variables $k_i$ may be fixed for positive samples while the list of possible unknown variables $k_i$ may be updated for negative samples. Second, given the updated set of unknown variables $k_i$, Equation (9) may be optimized over w. In one implementation of this learning process, the weights are initialized as follows: unary weights $w_i$ are randomly set while pairwise weights $w_{i,j}$ are set to zero.

Figure 4:
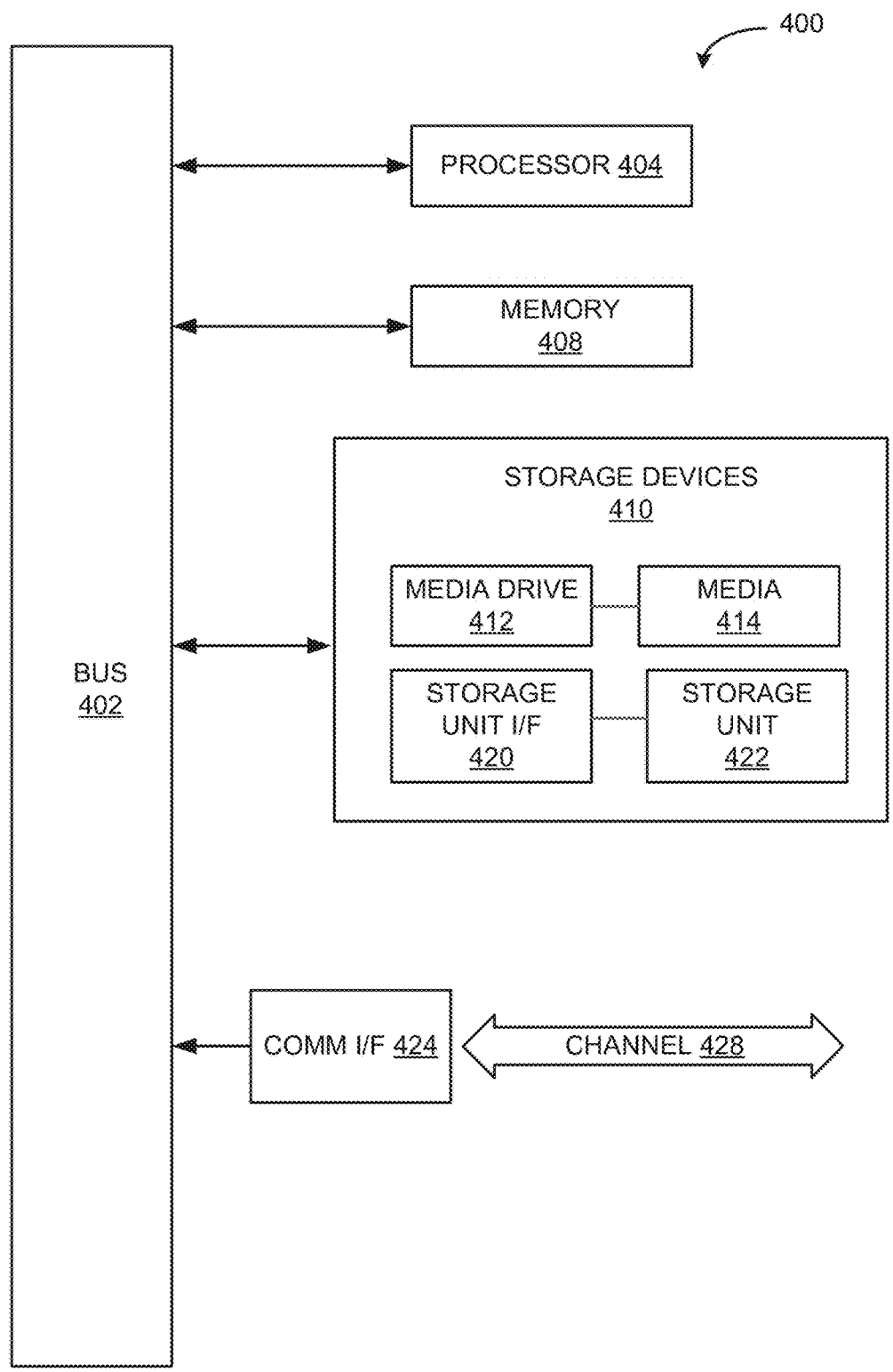
FIG. 4 illustrates an example computing module that may be used to implement various features of the methods disclosed herein.

FIG. 4 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 604. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a CD or DVD drive (R or RW), or other removable or fixed media drive might be provided. Accordingly, storage media 414 might include, for example, a hard disk, a solid state drive, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 610 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for recognizing actions, comprising:
    selecting a plurality of poselets that are components of an action;
    encoding each of a plurality of video frames as a summary of the detection confidence of each of the plurality of poselets for the video frame; and
    encoding correlations between poselets in the encoded video frames.

2. The method of claim 1 further comprising selecting optimal video frames based on the encoded video frames and encoded correlations.

3. The method of claim 2, wherein selecting optimal video frames based on the encoded video frames and encoded correlations comprises determining whether the action occurs in the selected optimal video frames.

4. The method of claim 3, wherein each of the plurality of poselets is an image patch of arbitrary size.

5. The method of claim 3, wherein each of the plurality of poselets is a partial or full three-dimensional configuration of a human body.

6. The method of claim 3, wherein determining whether the action occurs in the selected optimal video frames comprises:
    determining where the action takes place in space; and
    determining when the action takes place in time.

7. The method of claim 6, wherein the selected optimal frames model the action.

8. The method of claim 3, wherein encoding each of the plurality of video frames as a summary of the detection confidence of each of the plurality of poselets for the video frame comprises forming a poselet activation vector.

9. The method of claim 3, wherein encoding correlations between poselets in the encoded video frames comprises:
    determining if a first poselet is present in a first video frame; and
    determining if a second poselet is present in a second video frame.

10. The method of claim 9, wherein the first video frame and the second video frame are consecutive video frames.

11. The method of claim 9, wherein the first video frame and the second video frame are not consecutive video frames.

12. The method of claim 3, further comprising learning a first poselet classifier for each of the plurality of poselets.

13. The method of claim 12, further comprising learning a second poselet classifier for each of the plurality of poselets.

14. The method of claim 13, wherein selecting a plurality of poselets that are components of an action comprises for each of a plurality of poselets creating a first type of poselet based on the first poselet classifier and creating a second type of poselet based on the second poselet classifier.

15. The method of claim 13, wherein learning a poselet classifier comprises finding a mapping function that can locate a poselet in an unseen image given a set of images and a set of annotations for each image in the set of images.

16. The method of claim 3, wherein selecting the optimal video frames based on the encoded video frames and encoded correlations comprises maximizing a scoring function.

17. The method of claim 16, wherein the scoring function is maximized using dynamic programming.

18. A system, comprising:
a video recording device; and
a computer configured to:
select a plurality of poselets that are components of an action;
encode each of a plurality of video frames recorded by the video recording device as a summary of the detection confidence of each of the plurality of poselets for the video frame; and
encode correlations between poselets in the encoded video frames.

19. The system of claim 18, further comprising selecting optimal video frames based on the encoded video frames and encoded correlations.

20. The system of claim 19, wherein selecting optimal video frames based on the encoded video frames and encoded correlations comprises determining whether the action occurs in the selected optimal video frames.

21. The system of claim 20, wherein each of the plurality poselets is an image patch of arbitrary size.

22. The system of claim 20, wherein each of the plurality of poselets is a partial or full three-dimensional configuration of a human body.

23. The system of claim 20, wherein determining whether the action occurs in the selected optimal video frames comprises:
determining where the action takes place in space; and
determining when the action takes place in time.

24. The system of claim 23, wherein the selected optimal frames model the action.

25. The system of claim 20, wherein encoding each of the plurality of video frames as a summary of the detection confidence of each of the plurality of poselets for the video frame comprises forming a poselet activation vector.

26. The system of claim 20, wherein encoding correlations between poselets in the encoded video frames comprises:
determining if a first poselet is present in a first video frame; and
determining if a second poselet is present in a second video frame.

27. The system of claim 26, wherein the first video frame and the second video frame are consecutive video frames.

28. The system of claim 26, wherein the first video frame and the second video frame are not consecutive video frames.

29. The system of claim 20, further comprising learning a first poselet classifier for each of the plurality of poselets.

30. The system of claim 29, further comprising learning a second poselet classifier for each of the plurality of poselets.

31. The system of claim 30, wherein selecting a plurality of poselets that are components of an action comprises for each of a plurality of poselets creating a first type of poselet based on the first poselet classifier and creating a second type of poselet based on the second poselet classifier.

32. The system of claim 30, wherein learning a poselet classifier comprises finding a mapping function that can locate a poselet in an unseen image given a set of images and a set of annotations for each image in the set of images.

33. The system of claim 20, wherein selecting the optimal video frames based on the encoded video frames and encoded correlations comprises maximizing a scoring function.

34. The system of claim 33, wherein the scoring function is maximized using dynamic programming.

* * * * *